(No Model.)

G. JORDAN.
APPARATUS FOR DRYING WALL PAPER.

No. 358,274. Patented Feb. 22, 1887.

WITNESSES:
A. Schehl.
Martin Petry.

INVENTOR
George Jordan
BY
Jacques Raegener
ATTORNEYS.

UNITED STATES PATENT OFFICE.

GEORGE JORDAN, OF NEW YORK, N. Y.

APPARATUS FOR DRYING WALL-PAPER.

SPECIFICATION forming part of Letters Patent No. 358,274, dated February 22, 1887.

Application filed May 11, 1886. Serial No. 201,825. (No model.)

*To all whom it may concern:*

Be it known that I, GEORGE JORDAN, of the city, county, and State of New York, have invented certain new and useful Improvements in Apparatus for Drying Wall-Paper, of which the following is a specification.

This invention relates to an improved apparatus for drying wall papers which are grounded and printed in water-proof colors prepared with a volatile solvent—such as turpentine, alcohol, benzine, &c.; and the invention consists of an apparatus for drying wall-papers in which the paper is conducted into a heated casing and passed over a suitable guide-roller in the same, while the volatile solvent is evaporated in the casing and condensed on condensers that are cooled by water or other means, the condensed vapors being drawn off by means of collecting-pipes for further use.

Figure 1:
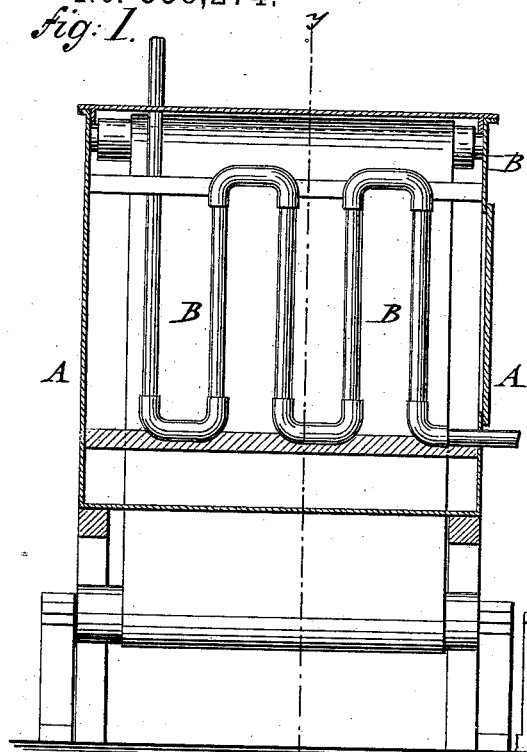
Figure 2:
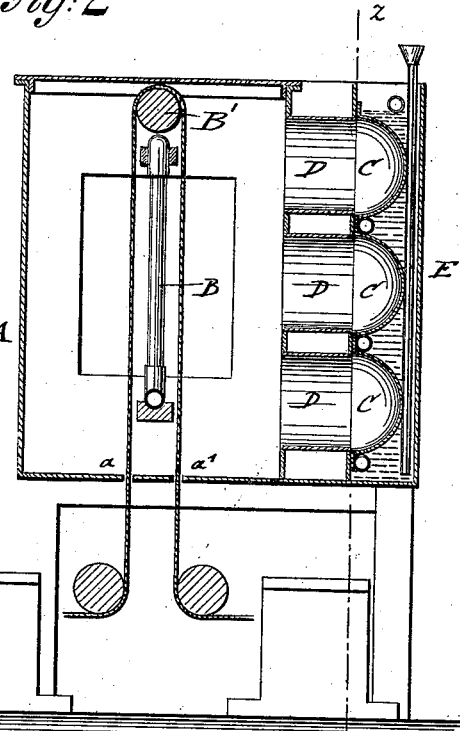
Figure 3:
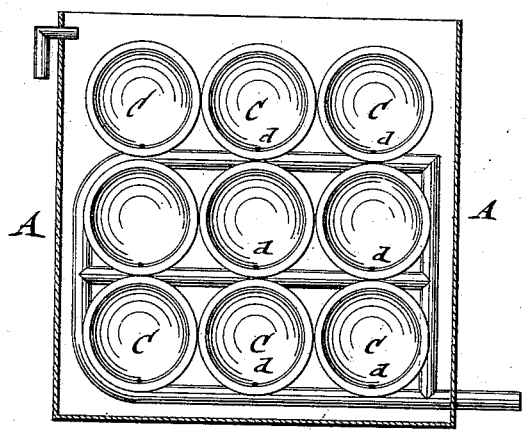
Figure 4:
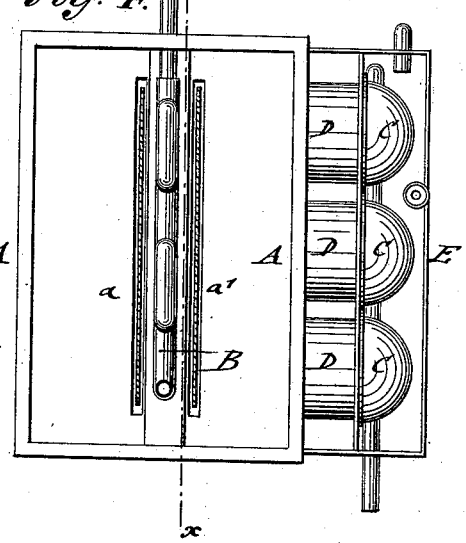

In the accompanying drawings, Figure 1 represents a vertical longitudinal section of my improved apparatus for drying wall-papers on line $x\ x$, Fig. 4. Fig. 2 is a vertical transverse section on line $y\ y$, Fig. 1. Fig. 3 is a vertical longitudinal section on line $z\ z$, Fig. 2; and Fig. 4 is a plan of the same with the top plate removed.

Similar letters of reference indicate corresponding parts.

Referring to the drawings, A represents a casing, which is made of sheet metal or other suitable material, and provided at one side with a door or removable panel for giving access to the same. The casing A is closed at the top and sides, and provided at the bottom with longitudinal slits $a\ a'$, for the admission of the wall-paper to be dried in the casing. The casing is heated by steam, hot air, or other heating medium, either by one or more coils of pipes, B, arranged longitudinally in the same, or by a steam-jacket or otherwise. At the upper part of the casing is arranged a guide-roller, B', over which the wall-paper that is passed in through one bottom slit, $a$, is conducted, it passing out again through the other bottom slit, $a'$, as shown in Fig. 2. While passing through the casing the solvent used in preparing the color is evaporated and condensed by contact with hemispherical condensers C, that communicate by cylindrical pipes D with openings in the side walls of the casing, as shown in Figs. 2, 3, and 4. The hemispherical condensers C are cooled by water or other medium, which is supplied to an exterior jacket, E, and conducted off by an overflow pipe, as shown in Figs. 2 and 4. The condensed solvent is collected at the lower part of the condensers C, and conducted through bottom openings, $d$, to collecting-pipes F, which conduct it off for further use. By this means the wall-paper is not only quickly dried by evaporating the volatile solvents, but the latter regained for further use by the condenser arranged in connection with the drying apparatus.

Having thus described my invention, I claim as new and desire to secure by Letters Patent—

1. The combination, with a heated casing having openings in one of its side walls and a support for the wall-paper in said casing, of a condenser formed of sections, and tubes connecting openings of the casing with the sections of the condenser, substantially as shown and described.

2. The combination, with a heated casing having openings in one of its side walls, a support for the wall-paper in said casing, of a condenser formed of sections, tubes connecting the openings of the casing with the condenser-sections, a cooling water-jacket surrounding said condenser, and collecting-pipes that connect with bottom openings of the condenser-sections, substantially as set forth.

In testimony that I claim the foregoing as my invention I have signed my name in presence of two subscribing witnesses.

GEORGE JORDAN.

Witnesses:
   PAUL GOEPEL,
   CARL KARP.